United States Patent [19]
Best

[11] Patent Number: 5,676,043
[45] Date of Patent: Oct. 14, 1997

[54] GRIDDLE ASSEMBLY HAVING DISCRETE COOKING ZONES

[76] Inventor: Willie H. Best, 18-C The Heritage, 1829 Senate St., Columbia, S.C. 29201

[21] Appl. No.: 539,015

[22] Filed: Oct. 3, 1995

[51] Int. Cl.$^6$ .............................. A47J 37/10; H05B 3/00
[52] U.S. Cl. .................. 99/331; 99/422; 99/447; 219/459; 219/462
[58] Field of Search ................ 99/331, 422, 423, 99/424, 425, 447, 349; 126/39 H, 39 N, 39 J, 41 R; 219/459, 462, 530

[56] References Cited

U.S. PATENT DOCUMENTS

| | | | |
|---|---|---|---|
| 3,241,542 | 3/1966 | Lotter | 126/39 J |
| 5,413,032 | 5/1995 | Bruno et al. | 99/422 X |
| 5,467,695 | 11/1995 | Keller et al. | 99/422 |

FOREIGN PATENT DOCUMENTS 0197905  10/1986  European Pat. Off. .............. 99/422

*Primary Examiner*—Reginald Alexander
*Attorney, Agent, or Firm*—Isaf, Vaughan & Kerr

[57] ABSTRACT

A large, thin griddle plate defines discrete heating zones, so that each zone has its own temperature. The griddle plate is made of a thin, relatively low conductivity metal and received along its bottom surface substantially thick, juxtaposed heat transfer blocks disposed in spaced relationship, side-by-side, beneath and laminated to discrete portions of the griddle plate. Infra-red burners carried beneath the blocks supply infra-red heat and convection heat to said blocks. The blocks are adhered to the griddle plate by an adhesive thermal barrier having heat conductive metal therein.

25 Claims, 4 Drawing Sheets

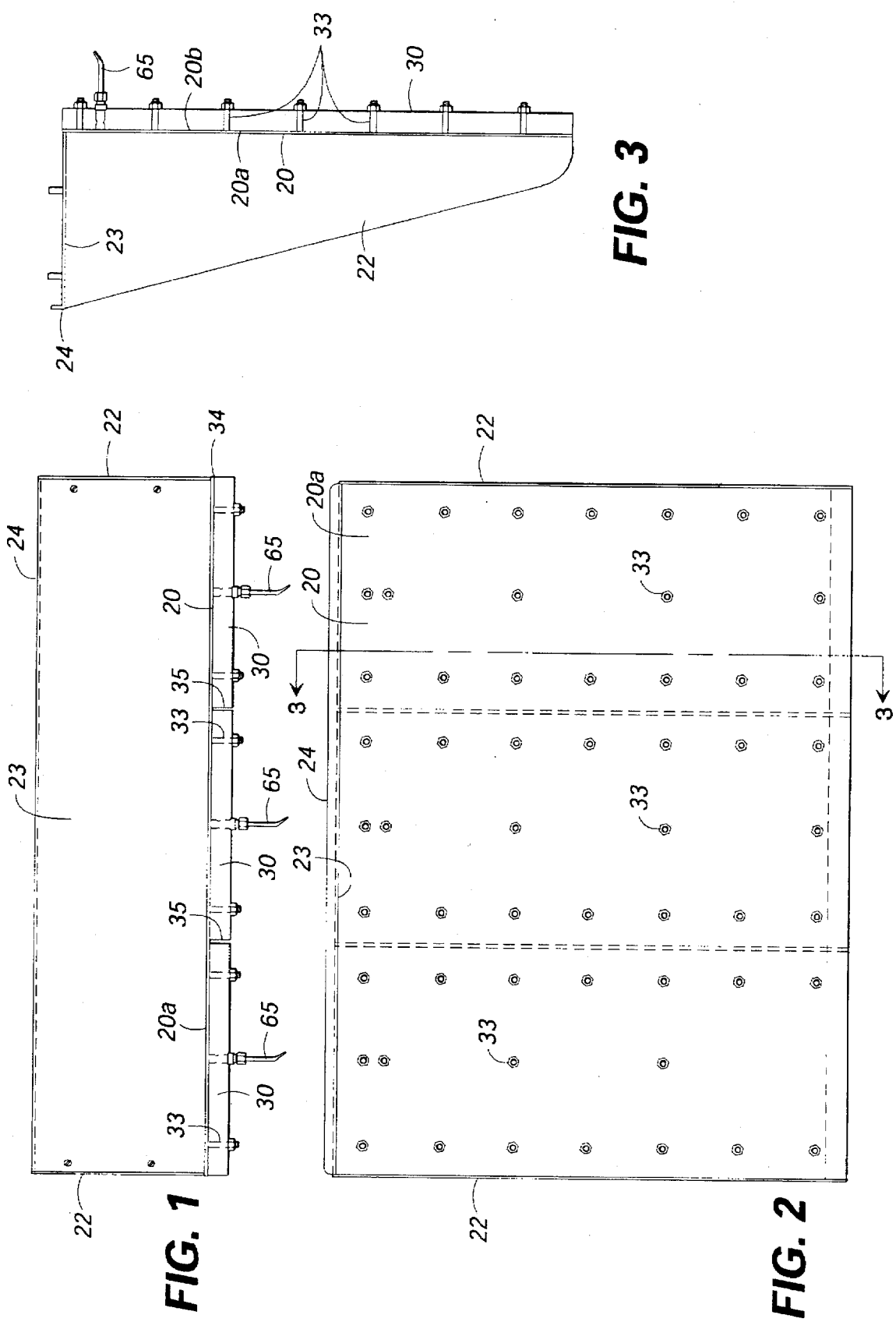

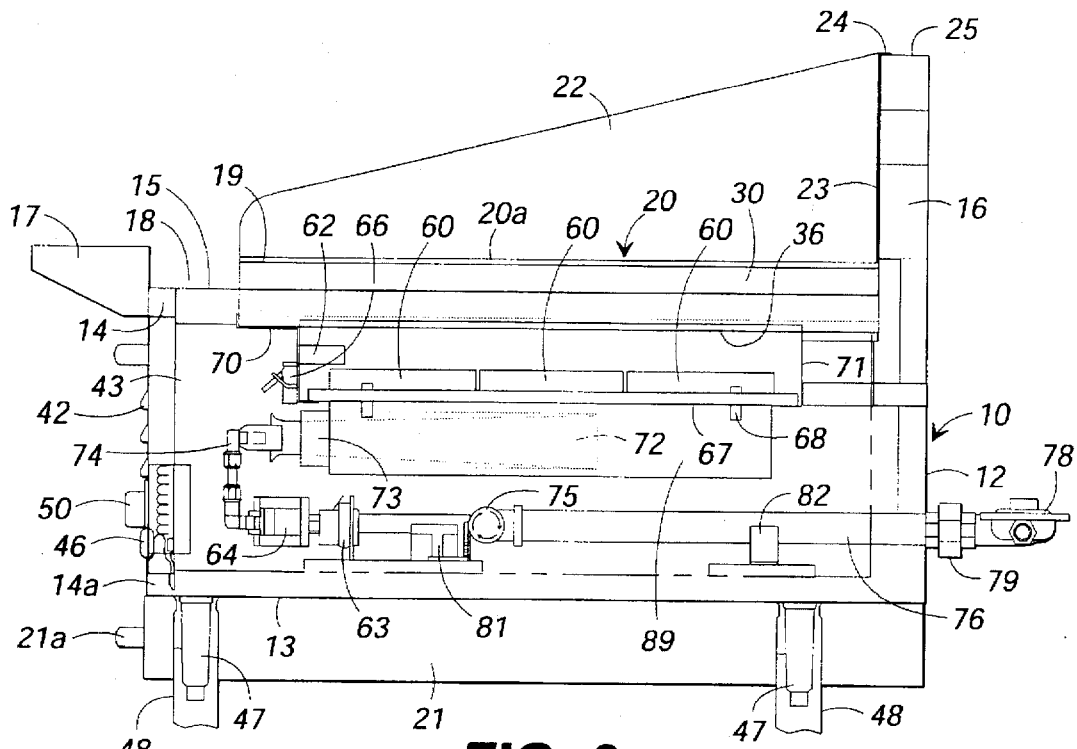
FIG. 6
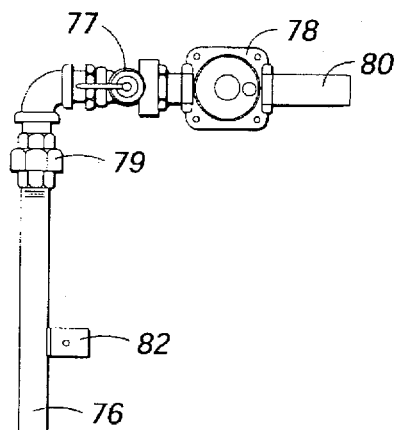
FIG. 8
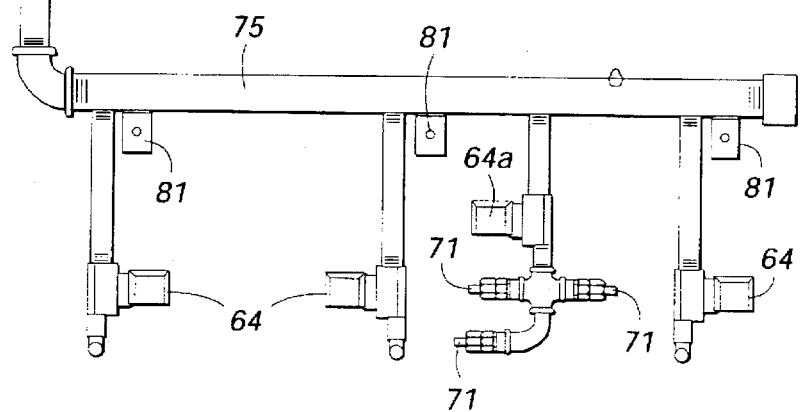

5,676,043

GRIDDLE ASSEMBLY HAVING DISCRETE COOKING ZONES

FIELD OF INVENTION

This invention relates to a griddle assembly and is more particularly concerned with a griddle having discrete, separately heated, cooking zones and the process carried out thereby.

BACKGROUND OF THE INVENTION

A griddle assembly is a cooking apparatus in which the heat is transferred from a heating element through a relatively large flat heated metal plate to heat the food on its flat upper surface. Usually, the food is cooked by virtue of food being in direct contact with the heated surface. Some chefs also utilize the griddle assembly to heat food or to keep food, contained within a pan or pot, in a heated condition.

The majority of griddles of the griddle assemblies are relatively thick (up to one inch) steel or cast iron plate that allow the heat to be conducted from the heat source to the cooking surface of the plate. The mass of the plate provides some thermal inertia to prevent rapid cooling of the surface when the cold food, such as a frozen steak or frozen hamburger, is placed on the surface.

One type of griddle has used a thin aluminum plate or the heat transfer medium. Aluminum plates are used more on griddles that must be portable, to some extent. An example of such a griddle would be one that would be used for field cooking by military personnel.

Another type of griddle is one in which the metal heat transfer medium is plated with another type of metal, such as chromium. The chromium can then be highly polished which provides a surface that is readily cleaned, compared with a steel or cast iron surface. A secondary benefit of the polished surface is that it minimizes the mount of heat transferred from the surface of the griddle by infra-red radiation, that otherwise may be absorbed by a person working in front of the griddle.

Such prior art griddle assemblies have inherent heat transfer problems associated with their designs. Except for very small griddle assemblies, most griddle assemblies have multiple burners for heating specific segments of the heat transfer griddle. An inherent problem with attempting to control the heat of specific segments of the griddle is that a continuous, solid, heat transfer plate conducts heat laterally as well as vertically. Thus, if one wished to heat only the first segment of a griddle and leave the other segments unheated, the heat applied to a prior art griddle would migrate by conduction from the desired segment to the other segments where the heat was not required. Therefore, more energy would be used by the prior art griddle to heat the first segment of the plate, only because the heat migrated to the colder segments. Also, in instances where it is desired to maintain different temperatures for different segments of the griddle, migration of the heat from one segment to the other segment will usually adversely affect the cooking performance. Specifically, it is difficult to maintain different desired surface temperatures in various selected segments of a griddle surface. Obviously, this problem is not a factor when the entire griddle surface is heated to the same temperature.

Another major problem with most prior art griddles is that it is difficult to maintain uniform temperature within a specified segment of the surface. Even when a heat transfer plate is as thick as one inch, the temperature of the surface will vary somewhat, based upon the energy distribution on the first heated side of the plate. For example, in most griddles, the surface temperature decreases toward the edges of the plate from a higher temperature in the center. This is due, in part, to the way the energy is distributed on the bottom surface of the plate, and also, to the limited heat transfer ability of steel and cast iron. When the heat transfer plate is aluminum, the heat transfer distribution is much superior to that of steel, but usually the aluminum plates are much thinner; therefore, the benefit of the higher thermal conductivity of aluminum is minimized because of the decreased thickness of the plate. Another disadvantage of an aluminum griddle is that the surface is relatively soft and can easily be dented and scratched by a spatula used by the chef while cooking on the griddle.

Both an aluminum surface or a steel surface can be electro-plated, as previously described, but the electro-plating is relatively thin—only a few thousands of an inch—and the electro-plated coating, in some instances, has a tendency to be chipped away from the base metal. Also, because of the thin plated surface, the griddle can be damaged by cooking utensils.

Stainless steel would be an ideal material for the cooking surface of a griddle, but because of its very low thermal conductivity—only 30% of the thermal conductivity of carbon steel and only approximately 10% of the thermal conductivity of aluminum—it would be assumed to be impractical to make the entire heat transfer plate of a griddle from stainless steel, primarily because it would be very difficult to obtain uniform heat distribution for the surface. Also, in addition to the corrosion resistant properties of stainless steel, stainless steel can be polished to an almost mirror-like finish, which essentially eliminates any radiation from its polished surface, due to the low emissivity. A polished surface of stainless steel also minimizes cleaning efforts.

Still another problem with prior art griddle assemblies is that the interior of the griddle assembly must be serviced periodically. This usually entails lifting a heavy metal griddle to an inclined position to permit access to the heating elements. The griddle is thus difficult to manipulate.

SUMMARY OF THE INVENTION

The griddle assembly of the present invention includes a griddle or top plate formed of a relatively large unitary, (one piece) rectangular sheet which provides a highly polished, reflective horizontal, upper, cooking surface and is of relatively low thermal conductivity. A plurality of spaced, individual, heat transfer plates or blocks are securely fixed flat against, and in physical contact with, the lower surface of the upper griddle plate. Each lower heat transfer plate is of relatively high thermal conductivity and is separated from its adjacent heat transfer plates by air gaps or other forms of insulation to prevent appreciable lateral transfer of heat from one discrete heat transfer plate to the next.

Respectively beneath the heat transfer plates are individual groups of heating elements usually either electrical heating elements or gas burners. Several longitudinally disposed, juxtaposed, heating elements are carried as side-by-side units in a drawer, having drawer slides so, that the drawer can be pulled, sidewise, outwardly, for servicing and be returned to its closed condition.

The upper griddle plate is preferably thinner than the lower plate and made of stainless steel or other metal, which has a relatively low conductivity, under about 20 BTU-FT/FT$^2$HR° F. The lower heat transfer plates are relatively thick blocks, usually more than one-half of an inch and made of a material having high thermoconductivity, having above about 90/BTU-FT/FT$^2$HR° F., such as aluminum or copper. Thus, the griddle assembly has a composite griddle which is formed of two different types of metal sandwiched or laminated together to form a bimetal element.

In the preferred embodiment, stainless steel is used for the upper unitary plate of the griddle to take advantage of its properties and the lower discrete blocks or plates of aluminum are laminated to the bottom surface of the stainless steel to take advantage of the heat transfer properties of aluminum. The specific heat of aluminum is approximately double that of steel; therefore, more thermal inertia per pound of plate is provided by this bimetal combination of stainless steel and aluminum. Aluminum or copper are recommended for the discrete blocks or plates because of their superior heat transfer properties. However, because of the cost of copper, aluminum is the more practical material to use. Since the thermal conductivity of the aluminum is approximately ten times greater than that of stainless steel, the heat delivered to the aluminum blocks is uniformly dispersed within each aluminum block, and since the stainless steel surface is relatively thin compared to the aluminum plate, heat transfer occurs by conduction from the aluminum plate into the stainless steel. The upper surface of the stainless steel cooking plate is highly polished to reduce radiation and to enhance cleaning.

Radiant heaters, in the form of infra-red gas burners, are preferably employed as heating elements below the heat transfer aluminum blocks to heat these blocks individually. When the plates are bonded together, the thermal barrier of the bond improves the heat distribution within the lower block because the bond causes a small resistance to the heat flow and forces the improved distribution of the energy.

For ease of cleaning, repair and replacement, the heating elements are mounted within a slidable drawer so that, when the source of gas and/or electricity are disconnected, the drawer can be pulled out to an open cantilever supported position.

Accordingly, it is the object of the present invention to provide a griddle assembly which can be manufactured to high standards of quality, is durable in structure, and efficient in operation.

Another object of the present invention is to provide a griddle assembly in which the griddle has the desirable combined properties of two different metals to provide improved and superior performance as compared to a griddle formed from a single type of metal.

Another object of the present invention is to provide a griddle assembly having temperature zones or segments which can be controlled independently of each other, and in which appreciable lateral conduction of the heat from one zone to the next is essentially eliminated.

Another object of the present invention is to provide a griddle assembly in which the thermal inertia, per pound of weight, is increased, while, at the same time, providing an ideal cooking surface.

Another object of the present invention is to provide a griddle assembly in which the heat energy can be transferred from a heat source by both convective heat transfer and by infra-red radiation.

Another object of the present invention is to provide a griddle assembly in which the heating zones or increments have improved uniform temperatures over the surface of each incremental zone.

Another object of the present invention is to provide a griddle assembly providing a highly polished surface with low emissivity characteristics.

Another object of the present invention is to provide a griddle assembly which is easily cleaned.

Another object of the present invention is to provide a griddle assembly in which the cooking surface possesses a low emissivity and provides decreased heat loss by infra-red radiation from the griddle surface to the surrounding area.

Another object of the present invention is to provide a griddle assembly in which the operating components are easily accessed for servicing of the controls and burners.

Another object of the invention is to provide a process for heating food products which will segregate heating of the food into prescribed zones, providing substantially different temperatures in different, adjacent, contiguous, heating zones.

Another object of the present invention is to provide a griddle assembly in which different portions of the griddle will have zones heated to and maintained at substantially different selected temperatures.

Other objects, features and advantages of the present invention will become apparent from the following description when considered in conjunction with the accompanying drawings, wherein like characters of reference designate corresponding parts throughout the several views.

BRIEF DESCRIPTION OF THE DRAWINGS

FIG. 1 is a front elevational view of the griddle portion of the griddle of a griddle assembly constructed in accordance with the present invention;

FIG. 2 is a plan view of the griddle shown in FIG. 1;

FIG. 3 is a cross sectional view along line 3—3 of the griddle shown in FIG. 2;

FIG. 6 is a cross sectional view taken substantially along line 6—6 of FIG. 4;

FIG. 8 is a view of the gas supply piping for the griddle assembly shown in FIG. 4.

DETAILED DESCRIPTION

Figure 4:
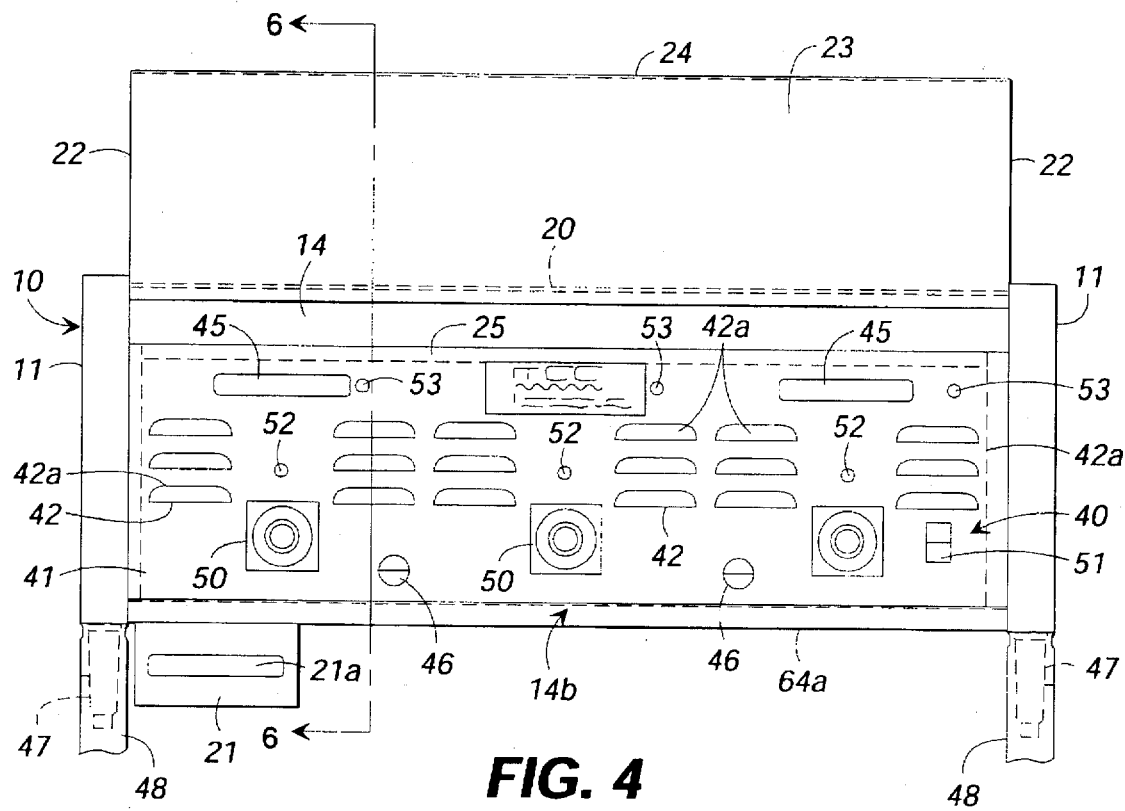
FIG. 4 is a front elevational view of the griddle assembly constructed in accordance with the present invention and having the griddle of FIGS. 1, 2 and 3 incorporated therein and the workshelf removed.

Referring now in detail to the embodiment shown in the drawings, which depicts the preferred embodiment of the invention, numeral 10 in FIG. 4 denotes the outer housing or casing of the griddle assembly of the present invention. This outer housing 10, has a pair of opposed upright, rectangular, insulated, fiberglass, side panels 11 connected at their rear portions by an upright back 12 and a horizontal bottom 13. Upper and lower front transverse crossbars 14 and 14a, extending between side panels 11 of housing 10, define with the front edges of side panels 11, a rectangular front opening 14b. The back 12 extends upwardly beyond side panels 11, so as to form at its upper, portion a part of an upstanding rear chimney 16 communicating with the interior of housing 10.

An upper front cross bar 14, extending between side panels 11, provides a support for a bracket 15 which, in turn, supports a transversely disposed, forwardly extending work shelf 17, seen in FIG. 6. Inwardly of the work shelf 17, the bracket 15 defines an upwardly opening transversely disposed grease trough 18. The inner edge of bracket 15 has an inwardly protruding upper ledge 19. Grease trap 18 directs the grease down pipe 18a discharging into a removable grease catch basin 21 having handle 21a.

Disposed over the essentially open, upper portion of the outer housing 10 is a flat, horizontally disposed, removable griddle or griddle plate, denoted generally by the numeral 20. The griddle 20 is a single piece, continuous, thin, flat, rectangular, continuous member formed of a relatively low thermal conductivity metal. This plate 20 is preferably formed from a 187 stainless steel sheet, having a thickness of about 0.118 inches and a thermal conductivity of 20 BTU-FT/FT²HR° F. Welded to the opposed side edges of the griddle plate 20 are a pair of opposed, generally triangular, upstanding, parallel, side splash guards 22, the rear edges of which are joined by a rectangular, upstanding, back splash guard 23. The lower edge of the back splash guard 23 is welded to the rear edge of griddle 20. A flange 24, along the upper edge of back splash guard 23, overhangs the upper horizontal edge 25 of chimney 16 while the front edge of griddle plate 20 is supported by ledge 19. Thus, the grease accumulated on the upper cooking surface 20a can be urged by a chef from the cooking surface 20a into the grease trough 18. The upper surface or cooking surface 20a of plate 20 is highly polished so as to reduce to a minimum the radiant heat which is radiated upwardly, from the surface 20a.

Below and fixedly secured to the bottom or lower surface 20b of the griddle plate 20 are a plurality of juxtaposed, spaced, individual, right rectangular, parallelepiped, heat transfer, blocks or plates 30 which are preferably of aluminum with a thermal conductivity of about 90 BTU-FT/FT²HR° F. or some other metal such as copper which possesses a high thermal conductivity above about 50 BTU-FT/FT²HR° F. These individual blocks or plates 30 should be between ⅝ inch and 2 inches thick and preferably about one inch in thickness. The griddle plate 20 has a continuous surface and should have a thermal conductivity no greater than one-half the thermal conductivity of plate 30. The preferable thickness of plate 30 should be at least three times the thickness of plate 20 and the combined thickness of plate 20 and plate 30 should be between one-half inch and two inches.

Figure 7:
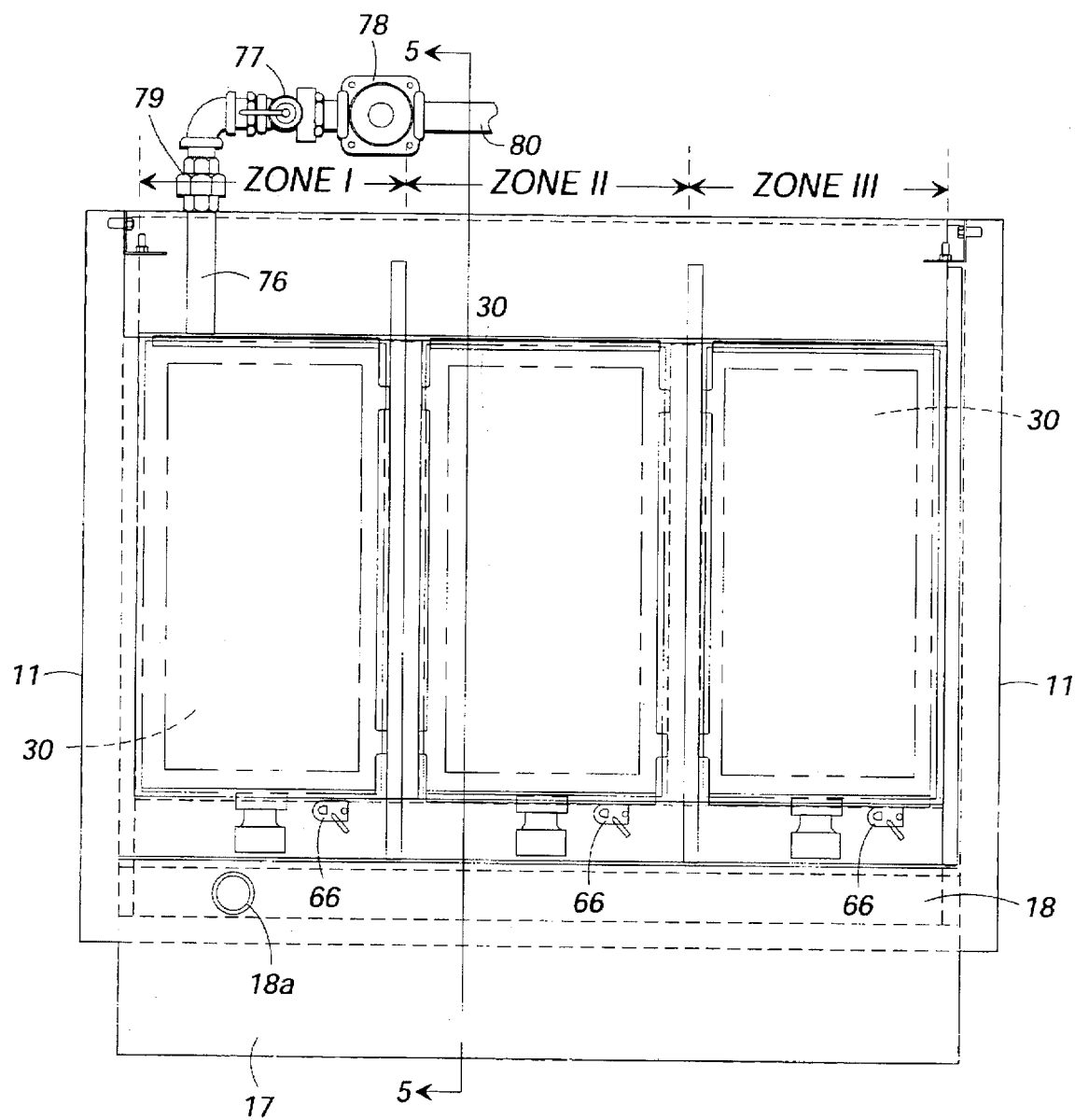
FIG. 7 is a plan view of the griddle assembly shown in FIG. 4.

The number and positioning of the plates 30 depend upon the number of cooling zones desired. For example, three such zones, namely, left zone I, central zone II and right zone III are illustrated in FIG. 7, extending respectively from front to back along plate 20. Below each of these zones is an individual rectangular plate or block 30. These spaced plates or blocks 30 of aluminum are laminated, side-by-side, to the bottom surface 20b of the stainless steel plate 20 to define these three discrete cooking zones or segments. The respective blocks 30 are separated by air gaps, which prevent lateral heat transferred by conduction, and thereby restrict the heat applied to each aluminum block or plate 30 to its designated zone. Since the thinner stainless steel plate 20, to which the blocks 30 are laminated, possess very low thermal conductivity, namely 20 BTU-FT/FT²HR° F., the lateral heat transfer through the stainless steel is quite limited and therefore, the heat energy tends to stay within the boundaries of the designated heat zone. This feature and the substantial thickness of block 30 provide for a very uniform distribution of the heat energy to the block and, thence, to the selected area of the stainless steel cooking surface 20a by conduction, but precludes appreciable transfer of energy from one zone to another by conduction. If desired, convective heat transfer from one designated zone to another can be further reduced by placing heat shields 31 between the designated blocks 30.

In FIG. 2 it is shown, one way of laminating the blocks 30 to grill plate 20 is by providing a plurality of flush mounted studs 33 welded to plate 20 passing through plate 30.

A silicone barrier 34 forms an interface for the bimetal griddle element of griddle plate 20 and block 30 which has the effect of causing the heat supplied to the aluminum block 30 to spread out to the edges of block 30 and to heat, more uniformly, the zone defined by an aluminum block 30. As a result, barrier 34 contributes to the uniform heating of block 30, and has the additional advantage of permitting the thickness of the stainless steel plate 20 to be reduced without appreciably changing the uniform heating of the selected segment or increment or zone of the plate 20 which is above the block 30 and in physical contact with the silicone barrier 34. The overall effect is that a lighter structure is provided, having improved uniformity of heat distribution for the selected heating zone I or zone II or zone III.

Regardless of whether studs 33 or a silicone barrier 34, or both, are used, heat from electrical or gas fired heating elements (to be described hereinafter), is transferred into a metal block or plates 30, which possess relatively good thermal conductivity, such as would be the case with an aluminum plate 30, and thence, essentially only to that portion or portions of the unitary plate 20 which is immediately above a selected heated plate 30. Thus, the heat distribution is improved in the heat transfer plate 30 receiving the heat energy. The thermal boundary or barrier 34 interferes with the heat transfer from the plate 30, forcing the flow of heat within the plate 30 in lateral directions. The benefit is that, when the heat is finally conducted through the plate 20, the heat energy will have been distributed quite evenly over the one third undersurface of the stainless steel griddle plate 20 which is to be heated. Indeed, the heat is so controlled that, if only one segment or zone of the three segment griddle plate 20 were heated by one block 30, one half of a hamburger patty, if appropriately placed on the grill plate 20, could be cooked, while the other one half would remain raw.

The thermal conductivity of the lower plate 30 should be at least twice the thermal conductivity of the upper plate 20. My experiments have shown that the interposed heat transfer barrier 34 is not necessary, if the thermal conductivity of the griddle plate 20 is substantially lower than the thermal conductivity of the material that forms lower plate 30 which receives the heat.

Still further isolation of the three juxtaposed plates 30 can include insulation strips 35 inserted into the air gaps between the adjacent sides of plates 30.

Below the plates 30 is a slidable drawer denoted generally by numeral 40. This drawer 40 is received through the front opening 14b of housing 10. Drawer 40 includes a front upright panel 41 having spaced ventilation ports 42 to permit air to be drawn therethrough into the interior of the housing 10 when the drawer 40 is closed and when closed, the front panel 40 is in about a common plane with the front of housing 10. The ports 42 are respectively covered by louvers 42a.

A pair of opposed, spaced, parallel upstanding, side walls 43, respectively extend rearwardly from the front panel 41 to terminate adjacent to and forwardly of back 12 (when the drawer 40 is in a closed condition). The drawer 40 also has a horizontal rectangular bottom panel 44, extending between the side walls 43 and connected along its forward edge to front panel 41. Spaced handles 45 protrude forwardly from front panel 41, while pivotable latches 46 form detents for retaining the drawer 40 in a closed condition, as shown in FIG. 6. Leveling legs 47, protrude from the panels 11 of housing 10, are received in appropriate tubing legs 48, in a counter (not shown) of a restaurant.

Each plate 30 can be heated electrically or from the combustion of a gaseous fuel, such as natural gas, propane gas or butane gas. When the griddle 10 is to be heated by a gaseous fuel, multi-port, infra-red gas burners 60 having burner radiating panels, such as the burner described in Best U.S. Pat. No. 3,277,948, are used. These burners 60 are spaced below the lower surface of plates 30. One advantage of the infra-red burner 60 is that heat can be transferred to the heat absorbing plate 30 by infra-red radiation, as well as by convective heat transfer. When an infra-red burner 60 is used as the heat source, it is important to consider the emissivity of the absorbing surface of the lower plate 30. The lower absorbing surface 30b of each plate 30 should be provided with a coating 36 imparting improved emissivity. Since the emissivity of aluminum is very low, it is even more important that the absorbing surface of the aluminum plate 30 be coated with a coating 61.

The coating 36 on the lower surface of plate 30 should possess an emissivity of 0.08 or greater. My experiments demonstrate that the cooking surface temperature of plate griddle 20 can be increased by about 50° F. when a coating 36 for absorbing heat is used, versus when one is not used, for the exact same energy input. The coating 36 can be porcelain enamel.

Another advantage of transferring the heat by infra-red radiation is that, since infra-red radiation is a function of the fourth power of the difference in temperatures (ΔT) of the emitting surface and the absorbing surface, more effective use can be made of the surface areas available for burning the gas and for absorbing the heat into plate 30.

The temperatures of the three zones of the griddle surface 21a are respectively controlled by controllers 50 seen in FIGS. 1 and 6, that operate regulators 63 to control the actuation of solenoid valves 64 for burners 60 for the respectively zones I, II and III. Thermocouples 65 embedded through the heat transfer plate 30 into the upper plate 20 of the bimetal structure, as shown in FIGS. 1 and 3, respectively detect the temperature of surface 20a in three zones. The controllers 50 and the thermocouples 65 provide the control signals which are compared in the regulators 63 to determine the setting for solenoids 64.

The source of ignition for the burners 60 from igniting pilots 66 are disposed adjacent to the burners or burner panels 60. These pilots 66 could be glow coils, glow bars, electric sparks, standing gas pilots or gas pilots, ignited from either a direct electric spark or from some type of electrical resistance element. In the preferred embodiment of the invention, the spark ignited gas pilot 66 provides a time ignition of the gas burners 60. The feeding of the gas which allows the gas solenoid 64 to open is controlled by the temperature controller 50, after ignition of the pilot 66 has proven from a heat sensor that generates a signal confirming that the pilot 66 is lighted.

Mounted on front panel 41, as seen best in FIG. 4, are three space controllers 50 having rotatable knobs respectfully, which function for selecting the desired temperature of the griddle surface. The front panel 41 also has an on-off master switch 51 and indicator lights 52 over each controller 50 for indicating that an appropriate burner or burners 60 have been lighted. The flames of the pilot lights 66 can be respectively observed through three pilot light view ports 53 in panel 41.

For slideably supporting the drawer 40 for movement between its closed and operative position and its opened cantilever supported condition, roller drawer slides 55 are connect between the side panels 11 and the side walls 43. The drawer slides 55, seen in FIG. 5, also support the drawer 40 extended in a horizontal and easily accessed, opened, cantilever supported condition.

Within the interior of the drawer 40 are three individual burners 60 arranged in spaced parallel, longitudinally extending, juxtaposed relationship so that the left hand zone I has one rectangular burner 60 in alignment below the left hand, heat transfer plate 30; the central zone II has one burner 60 below the central heat transfer plate 30 and the right hand zone III has one burner 60 below the right hand plate 30. Each burner 60 extends from front to rear throughout substantially the length of one plate 30. Each burner 60 has ceramic elements provided with a plurality of holes through which combustible gas passes for heating these elements and for generating infra-red heat as well as convection heat.

In the preferred embodiment of the invention, the burners 60 along with all of the control components, are carried by drawer 40 which can be readily withdrawn from the housing 10 to provide for ease of servicing any burner 60 or control component. When the drawer 40 is to be withdrawn from the housing 10, it is necessary to first cut off the gas and then disconnect the gas manifold from the supply (or the electricity), as the case may be.

When servicing is completed, the drawer 40 is simply slid back into place. With prior art griddles, however, the burners and control components are located immediately under the cooking surface of the components and thus changing the burners can be very difficult. In order to gain complete access to the prior art components, including the burners, it may be necessary to remove the heavy griddle plate 20 which is time consuming and will usually require at least two people. When drawer 40 containing the burners 60 and control components of the present invention are withdrawn, the drawer 40 is supported in cantilever fashion and either electrical energy or a gas supply can be easily connected temporarily for trouble-shooting purposes. When the work is completed, the temporary connections can be disconnected and the drawer 40 slid back into place and the permanent electrical and gas connections, such as connection 79, reconnected.

Each burner 60 is encompassed and supported by a longitudinally extending, rectangular frame 67, which, in turn, is bolted by bolts 68 on top of a common gas/air mixing plenum or chamber 69. The three gas/air mixing chambers 69 are disposed transversely, side-by-side, each extending longitudinally, front to back being supported by a pair of opposed, downwardly and inwardly extending front and rear burner support brackets 70 and 71. The ends of brackets 70, 71 are fixedly secured to the opposite inside surfaces of the side walls 43 and extend transversely parallel to each other across the interior of housing 10. The opposed brackets 70, 71 receive the front and rear portions of the frames 67 of all burners 60 so that the mixing plenums or chambers 69 hang pendent, parallel to each other, in the drawer 40.

One end of each mixing chamber 69 receives a venturi 72, carried by a cylindrical shroud 73, received through one end of the mixing chamber 69. As an elbow nozzle 74 is retained by a strap 74a on the end of venturi 72. Each nozzle 74 is controlled by an individual solenoid valve 64 which is connected to a transverse gas manifold 75, via the solenoid 64. Braces 81 support manifold 75 and brace 82 supports feed pipe 76 which feeds gas to the gas manifold 75.

In FIG. 8, it is seen that a coupling 79 couples the feed pipe 76 to a gas source pipe 80 having an on/off master valve 77 and a gas regulator 78. When the drawer 40 is to be pulled out, the gas is shut off at the master valve 77, then the coupling 79 is disconnected. The drawer 40 is therefore free to slide outward. The coupling 79 is reconnected and valve 77 when the drawer 40 is closed.

Each controller 50 is electrically connected to its individual regulator 63 which receives an input from its thermocouples 65, seen in FIGS. 1 and 3, so as to regulate the heat to its particular block 30. Regulator 63 is incapacitated until pilot light 66 is lighted. As is customary, if the pilot light 66 is not lighted, the solenoid valve 64 will remain closed and not respond to the setting of the controller 50. The temperature setting on the controller 50 allows the solenoid valve 64 to open and close to control the gas flow to the three burners 60, so as to maintain a prescribed temperature, for this particular zone, as detected by the thermocouple 65 of the zone.

Figure 5:
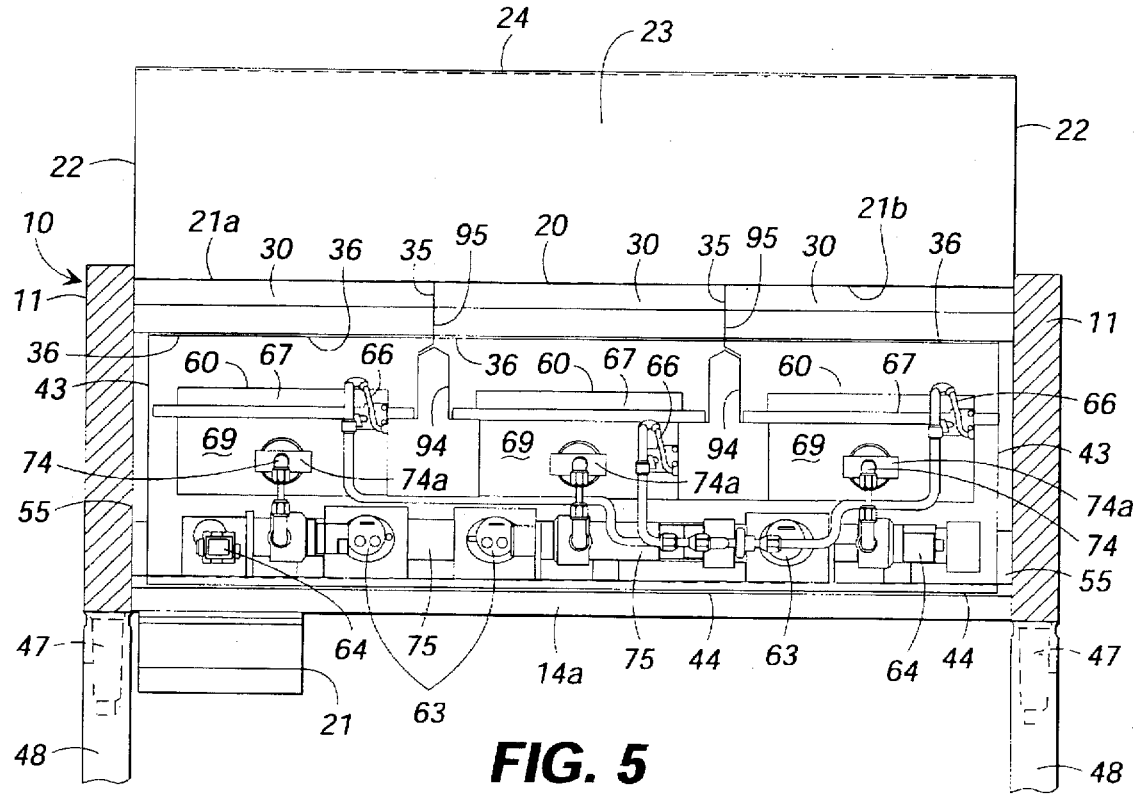
FIG. 5 is a vertical sectional view taken substantially along line 5—5 of FIG. 7.

For further isolating the heat from burners 60, a pair of inverted U-shaped, insulating baffles 94, as seen in FIG. 5, are interposed between each pair of burner groups, while other baffles 95 extend downwardly from plate 20 to terminate in overlapping relationship, as shown in FIG. 5.

OPERATION

During operation of the griddle, surface temperatures of surface 20a are maintained far more uniformly than in griddles employing a heat transfer plate constructed of a single type of metal. When gas and electrical energy is properly supplied to the griddle, to initiate the operation of the griddle, the power supply switch or master switch 51 is turned on. The controller 50 operates the pilot gas solenoid 64a to provide a supply of gas to pilot 66. The controller 50 also provides electrical energy through a high voltage transformer (not shown) to spark the ignitor of pilot 66. When the pilot 66 is ignited, a heat sensor (not shown) provides a signal to controller 50 that the pilot it lighted. The controller 50 interrupts the voltage to the transformer, which stops the sparking of the ignitor of pilot 66.

After the pilot 66 is proven, gas can then flow through solenoid valve 64a to the burner 60 if the surface temperature of the surface 20a is below the set point of controller 50 for that zone. Gas flows to the burner 10 and is ignited on the surface of burner 60 by pilot 66 and the burner 60 continues to operate until the set point temperature for the surface 20a is reached. At that time, current is interrupted to the solenoid valve 64 and the burner remains off until such time the temperature of surface 20a drops below the set point temperature of controller 50.

The griddle continues to operate in the mode described above until master power switch 51 is placed in the off position, which interrupts the power to all of the control components closing all of the gas solenoid valves 64.

It will be obvious to those skilled in the art that many variations may be made to the present invention as defined by the amended claims.

I claim:
1. A griddle assembly comprising:
 (a) an upper heat transfer plate defining an outer cooking surface and a lower inner surface, said upper plate being formed of a metal having a relatively low thermal conductivity;
 (b) a lower heat transfer plate disposed adjacent the lower surface of said upper plate, said lower plate being formed of a metal having a relatively high thermal conductivity with respect to the thermal conductivity of said upper plate;
 (c) said lower plate having an inner surface and an outer surface, the thermal conductivity of said lower plate being at least twice as great as the thermal conductivity of said upper plate; and
 (d) an insulator disposed between said upper plate and said lower plate, said insulator forming a first thermal barrier between said upper plate and said lower plate.
2. The griddle assembly defined in claim 1 wherein said lower plate includes a plurality of juxtaposed lower plates and a second thermal barrier laterally separating said lower plates from one another.
3. The griddle assembly defined in claim 1 wherein said upper heat transfer plate is formed of stainless steel and said lower heat transfer plate is formed of aluminum.
4. The griddle assembly defined in claim 2 wherein said second thermal barrier comprises an air space.
5. The griddle assembly defined in claim 2 including individual heating elements for separately heating each of said lower plates at different rates of heat with respect to one another.
6. The griddle assembly defined in claim 1 including heating elements for said heat transfer plates, said heating elements being spaced from said transfer plates and providing both infra-red heat and heat by convection to said heat transfer plates.
7. The griddle assembly defined in claim 6 wherein said heating elements are gas burners.
8. The griddle assembly defined in claim 1 wherein said insulator is comprised of silicone with flakes of copper therein.
9. The griddle assembly defined in claim 1 including a coating along the lower surface of said lower plate.
10. The griddle assembly defined in claim 9 wherein said coating comprises porcelain enamel.
11. A griddle, said griddle comprising:
 a framework;
 a one piece planar griddle plate of a first thermal conductivity supported on said framework, said griddle having a top cooking surface and an opposed bottom surface;
 a plurality of spaced and adjacent heat transfer plates of a second thermal conductivity greater than said first thermal conductivity secured to the bottom surface of said griddle plate, each said heat transfer plate being laterally spaced and generally insulated from each adjacent heat transfer plate to form a plurality of separate temperature control zones across the cooking surface of said griddle plate; and
 a modular heating element assembly supported on said framework with respect to said heat transfer plates, said assembly being moveable from a first position beneath said heat transfer plates into a second position cantilevered from said framework;
 said heating assembly comprising a plurality of spaced heating elements, one each of said heating elements being positioned beneath one each of said heat transfer plates in said first position for heating said heat transfer plates, said heating assembly further comprising a plurality of temperature zone controllers, one each for each said heating element for separately controlling the temperature of each said temperature control zone, respectively.
12. The griddle of claim 11, each of said heat transfer plates being constructed and arranged to uniformly distribute the heat emitted from said heating elements across each respective one of said temperature control zones.
13. The griddle of claim 12, wherein said second thermal conductivity is relatively greater than said first thermal conductivity and wherein each of said temperature control zones is generally insulated from the other of said temperature control zones with respect to lateral heat transmission therebetween within said griddle plate.

14. The griddle of claim 12, further comprising a thermal barrier disposed between each said heat transfer plate and the bottom surface of said griddle plate, each said thermal barrier being constructed and arranged to uniformly distribute the heat of each respective heating element across the cooking surface of each respective temperature control zone.

15. The griddle of claim 11, said griddle plate being constructed of stainless steel having a thickness of approximately 0.118 inches and a thermal conductivity of approximately 20 BTU-FT/FT$^2$HR° F.

16. The griddle of claim 11, each said heat transfer plate being constructed of aluminum having a thickness in the range of from approximately 0.625 inches to approximately 2.000 inches and a thermal conductivity of approximately 90 BTU-FT/FT$^2$HR° F.

17. The griddle of claim 11, each said heat transfer plate being constructed of copper having a thickness in the range of from approximately 0.625 inches to approximately 2.000 inches and a thermal conductivity of approximately 50 BTU-FT/FT$^2$HR° F.

18. The griddle of claim 11, wherein said second thermal conductivity of each said heat transfer plate is approximately four and one-half times greater than said first thermal conductivity of the griddle plate.

19. The griddle of claim 11, said griddle plate comprising stainless steel having a thickness of approximately 0.118 inches and a thermal conductivity of approximately 20 BTU-FT/FT$^2$HR° F., each of said heat transfer plates comprising aluminum having a thickness in the range of from approximately 0.625 inches to approximately 2.000 inches and a thermal conductivity of approximately 90 BTU-FT/FT$^2$HR° F., wherein the combined thickness of said griddle plate and said heat transfer plates is in the range of from approximately 1.5 inches to approximately 2.0 inches.

20. The griddle of claim 19, wherein the thickness of each of said heat transfer plates is at least three times greater than the thickness of said griddle plate.

21. A one-piece griddle having multiple discrete cooking zones, said griddle comprising:

a framework;

a one-piece planar griddle plate of a first thermal conductivity supported on said framework, said griddle having a top cooking surface and an opposed bottom surface;

a plurality of closely spaced heat transfer plates of a second thermal conductivity greater than said first thermal conductivity fastened to the bottom surface of said griddle plate and extending along the length thereof, each said heat transfer plate being laterally spaced and generally insulated from each adjacent heat transfer plate to form a plurality of separate temperature control zones across the cooking surface of said griddle plate; and a plurality of spaced gas fired heating elements, one each of said heating elements being supported on said framework in position beneath one each of said heat transfer plates for heating said heat transfer plates, each said heating element further comprising a temperature zone controller constructed to control the temperature thereof, said temperature zone controllers being constructed to operate independently of one another for separately controlling the temperature of each respective temperature control zone;

each said heat transfer plate being constructed and arranged to uniformly distribute the heat emitted from each respective one of said heating elements across each respective one of said temperature control zones, each of said temperature control zones being generally insulated from one another with respect to lateral heat transmission therebetween within said griddle plate.

22. The griddle of claim 21, further comprising a thermal barrier disposed between each said heat transfer plate and the bottom surface of said griddle plate, each said thermal barrier being constructed and arranged to uniformly distribute the heat of each respective heating element across the cooking surface of each respective temperature control zone.

23. The griddle of claim 21, wherein said second thermal conductivity of said heat transfer plates is approximately four and one-half times greater than said first thermal conductivity of the griddle plate.

24. The griddle of claim 21, said griddle plate comprising stainless steel having a thickness of approximately 0.118 inches and a thermal conductivity of approximately 20 BTU-FT/FT$^2$HR° F., and said heat transfer plates comprising aluminum having a thickness in the range of from approximately 0.625 inches to approximately 2.000 inches and a thermal conductivity of approximately 90 BTU-FT/FT$^2$HR° F.

25. The griddle of claim 21, said griddle comprising three separate temperature control zones.

* * * * *